US006996233B2

(12) United States Patent
Brokenshire et al.

(10) Patent No.: US 6,996,233 B2
(45) Date of Patent: Feb. 7, 2006

(54) SYSTEM AND METHOD FOR ENCRYPTING AND VERIFYING MESSAGES USING THREE-PHASE ENCRYPTION

(75) Inventors: Daniel Alan Brokenshire, Round Rock, TX (US); David Craft, Austin, TX (US); Harm Peter Hofstee, Austin, TX (US); Mohammad Peyravian, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 10/464,891

(22) Filed: Jun. 19, 2003

(65) Prior Publication Data

US 2005/0008162 A1 Jan. 13, 2005

(51) Int. Cl.
*H04L 9/00* (2006.01)
*H04K 1/00* (2006.01)
(52) U.S. Cl. .......................... 380/28; 380/259
(58) Field of Classification Search ................ 380/277, 380/283, 284, 286, 259, 255, 42, 28–29, 380/44–46; 713/168, 200, 201
See application file for complete search history.

(56) References Cited

U.S. PATENT DOCUMENTS

| | | | | |
|---|---|---|---|---|
| 4,941,176 A | * | 7/1990 | Matyas et al. | 380/280 |
| 5,517,567 A | * | 5/1996 | Epstein | 380/247 |
| 5,544,086 A | * | 8/1996 | Davis et al. | 705/68 |
| 5,727,062 A | * | 3/1998 | Ritter | 380/37 |
| 2003/0159036 A1 | * | 8/2003 | Walmsley et al. | 713/168 |

OTHER PUBLICATIONS

Schneier, Bruce. Applied Cryptography, Second Edition: Protocols, Algorithms, and Source Code in C. John Wiley & Sons, Inc., 1996. pp. 28-29, 169-175, 189-197, 357-363.*
Menezes, Alfred, et al. Handbook of Applied Cryptography. CRC Press LLC, 1997. pp. 233-237, 271-173.*
Merkle, Ralph C., and Martin E. Hellman. "On the Security of Multiple Encryption". Communications of the ACM, vol. 24, No. 7, Jul. 1981. pp. 465-467.*
Coppersmith, D. et al. "A proposed mode for triple-DES encryption". IBM Journal of Research and Development, vol. 40, No. 2, Mar. 1996. pp. 253-262.*

* cited by examiner

*Primary Examiner*—Emmanuel L. Moise
*Assistant Examiner*—Zachary A. Davis
(74) *Attorney, Agent, or Firm*—VanLeeuwen & VanLeeuwen; Leslie A. VanLeeuwen; Diana R. Gerhardt

(57) ABSTRACT

A method and system for encrypting and verifying the integrity of a message using a three-phase encryption process is provided. A source having a secret master key that is shared with a target receives the message and generates a random number. The source then generates: a first set of intermediate values from the message and the random number; a second set of intermediate values from the first set of values; and a cipher text from the second set of values. At the three phases, the values are generated using the encryption function of a block cipher encryption/decryption algorithm. The random number and the cipher text are transmitted to the target, which decrypts the cipher text by reversing the encryption process. The target verifies the integrity of the message by comparing the received random number with the random number extracted from the decrypted cipher text.

57 Claims, 9 Drawing Sheets

SYSTEM AND METHOD FOR ENCRYPTING AND VERIFYING MESSAGES USING THREE-PHASE ENCRYPTION

BACKGROUND OF THE INVENTION

1. Technical Field

The present invention relates in general to a system and method for encrypting, decrypting, and verifying the integrity of messages. In particular, the present invention relates to a system and method for using a three-phase encryption process to encrypt, decrypt, and verify the integrity of a message.

2. Description of the Related Art

The Internet provides an efficient and inexpensive means of communication between large numbers of users. The same infrastructure can be shared among the different users; it is unnecessary for each pair of communicating users to establish a separate channel of communication as is the case, for example, with users of standard telephones and fax machines. The sharing of the channels of communication provided by the Internet significantly increases the probability of intercepted communication, eavesdropping, tampering with the messages, etc. Thus, it has become increasingly important to have available means of communication that provide an efficient way of securing the transmission of messages between a source and a target over shared channels of communication such as the Internet. The most common method of secured communication is to encrypt the message at the source in such a way that practically only the target can decrypt the message.

Many types of encryption/decryption have been developed to address the need for secured communications. There are two main types of encryption techniques: secret key encryption and private/public key encryption. In secret key encryption, the same secret key is used both for the encryption of the message at the source and the decryption of the message at the target. An example of secret key encryption is the Data Encryption Standard (DES). In public/private key encryption, each user has a private key (which is kept secret from the other users) and a public key (which each user publicly distributes). The two keys are mathematically related in such a way that a source uses the target's public key to encrypt a message such that practically only the target can decrypt the message.

A good encryption standard must be computationally efficient for the source and the target, and at the same time, the standard must be not be easy to "break" using cryptanalysis: the art and science of breaking encryption algorithm. It is also important for the encryption standard to provide means for verifying the integrity of a message-whether a message was altered during its transmission through an unsecured medium.

What is needed, therefore, is a system and method that could provide an efficient encryption/decryption standard between a source and a target while not being susceptible to cryptanalysis. The system and method should also provide the capability to verify the integrity of a transmitted message to a high degree of probability.

SUMMARY

It has been discovered that the aforementioned challenges can be addressed by a method and a system for encrypting, decrypting, and verifying the integrity of a message using a three-phase encryption process. The structure of the three-phase encryption process makes cryptanalysis of the algorithm extremely difficult, which significantly reduces the probability of "breaking" the encryption. In addition, the current method and system provide a means for verifying the integrity of a transmitted message by comparing, at the target, a received control number to a decrypted control number.

The source and target share a secret master key, which the source uses to encrypt a message, and after the message is transmitted to the target, the target uses to decrypt the message. The message to be encrypted and transmitted to the target is received by the source in plain-text form. The source first generates a first and second random number and constructs a plain-text envelope comprising: the plain-text message; the first random number; the second random number; a pad field; and a number indicating the length of the pad field. The pad field is generated such that a length of: the plain-text message; the first random number; the second random number; the pad field; and the number indicating the length of the pad field is an integer multiple of a block size of a block cipher algorithm used in the encryption/decryption process. A first, second, and third key are subsequently generated. The three keys are used at each of the three phases of the encryption process. The keys are generated from the secret master key and the first random number using a decryption function of a block cipher algorithm used in the encryption/decryption process.

At the first phase of the encryption process, a first set of N intermediate blocks is generated from the N plain-text blocks and the first key using the function of a block cipher algorithm encryption/decryption. At the second phase of the encryption process, a second set of N intermediate blocks is generated from the first set of N intermediate blocks and the second key using the encryption function of the block cipher encryption/decryption algorithm. At the third and final phase of the encryption process, N cipher text blocks are generated from the second set of N intermediate blocks and the third key using the encryption function of the block cipher encryption/decryption algorithm.

A protected-text envelope is then constructed containing: a number indicating the length of the protected-text envelope; the first random value; and the N cipher-text blocks. The protected-text envelope is transmitted to a target over an unsecured medium such as the Internet.

The protected-text envelope is received by the target, which shares the source's secret master key. The target extracts from the protected-text envelope: the number indicating the length of the protected-text envelope; the first random value; and the N cipher-text blocks. The first, second, and third keys are then generated from the extracted first random number and the secret master key using the decryption function of the block cipher encryption/decryption algorithm.

At the first phase of the decryption process, the second set of the N intermediate blocks is generated from the N cipher-text blocks and the third key using the decryption function of the block cipher encryption/decryption algorithm. At the second phase of the decryption process, second set of the N intermediate blocks is generated from the first set of N intermediate blocks and the second key using the decryption function of the block cipher encryption/decryption algorithm. At the third and final phase of the decryption process, the N plain-text blocks are generated from the first set of N intermediate blocks and the first key using the decryption function of the block cipher encryption/decryption algorithm. The plain-text message is then extracted from the N plain-text blocks of the plain-text envelope.

In order to verify the integrity of the message, a first random number included in the N plain-text blocks is then extracted and compared to the first random number extracted from the protected-text envelope. If the two numbers are not equal the received message is not trusted since it can be concluded that the message was most likely altered during its transmission from the source to the target. If the two numbers are equal, the message can be trusted.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention defined in the claims following the description.

Figure 1:
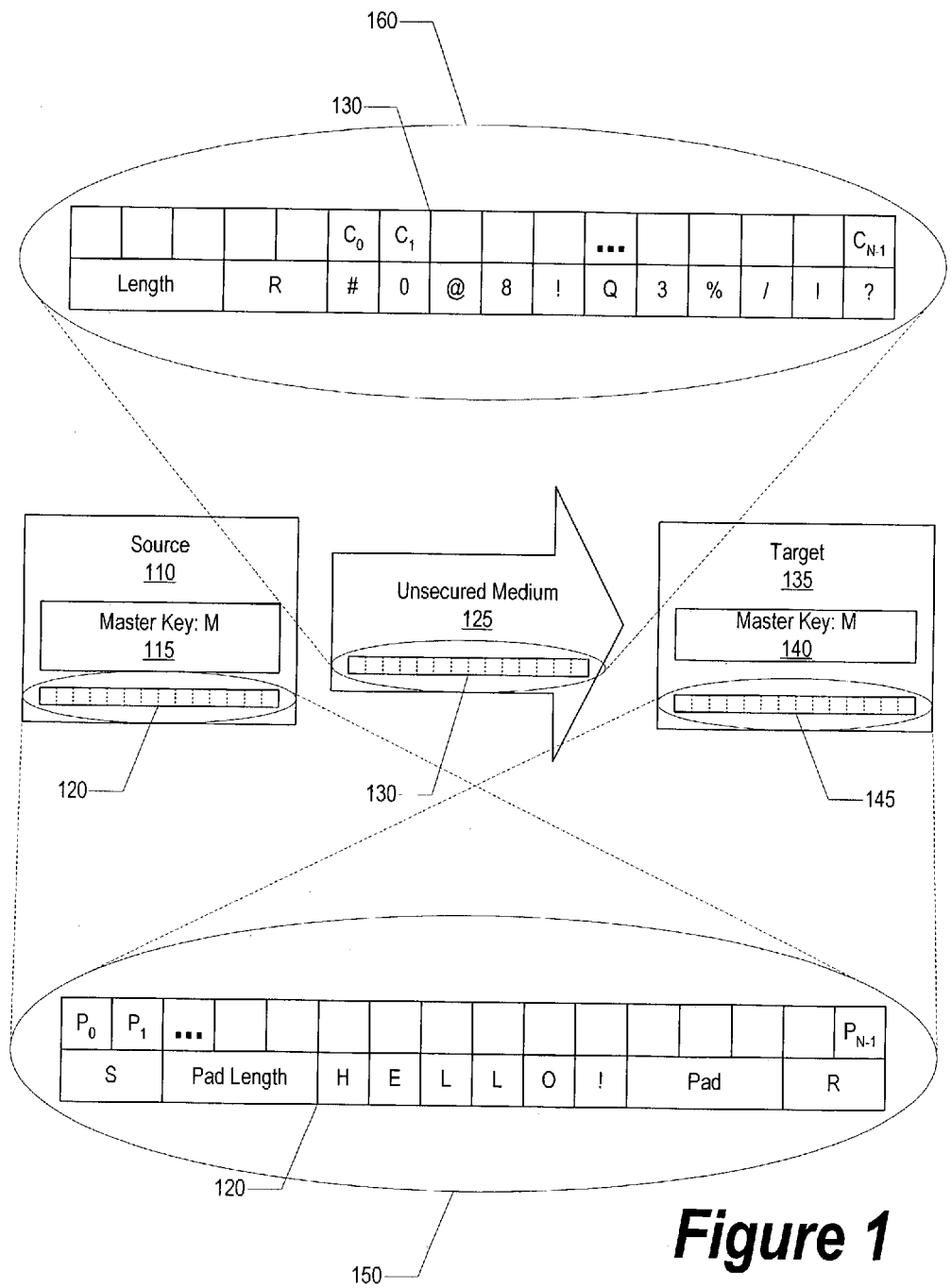
FIG. 1 is a block diagram illustrating the encryption of a message at a source, transmission in encrypted form over an unsecured medium, and decryption of the message at a target.

FIG. 1 is a block diagram illustrating encryption of a message at a source, transmission in encrypted form over an unsecured medium, and decryption of the message at a target. Source 110 is configured to receive a plain-text message and construct plain-text envelope 120 In one embodiment, plain-text envelope 120 includes the plain-text message and additional numbers and fields generated at the source. Oval 150 shows a larger image of plain-text envelope 120 In one embodiment, envelope 120 contains N blocks $P_0$–$P_{N-1}$ that include the random number S, a number indicating the length of the pad field, the message "Hello!", a pad field, and the random number R. Source 110 encrypts plain-text envelope 120 to create N cipher text blocks $C_0$–$C_{N-1}$ using master key M 115 and the three-phase encryption process. Protected-text envelope 130 is then constructed using the cipher text and other control numbers and transmitted through unsecured medium 125 Oval 160 shows a larger image of protected-text envelope 130. In one embodiment, envelope 130 contains a number indicating the length of the protected-text envelope, the control random number R, and the cipher text.

Target 135 is configured to receive the message and decrypt the extracted cipher text using master key M 140, which is shared between the source and the target. After decryption, the target recovers plain-text envelope 145, which should be identical to plain-text envelope 120 unless the cipher text was altered during transmission through unsecured medium 125.

Figure 2:
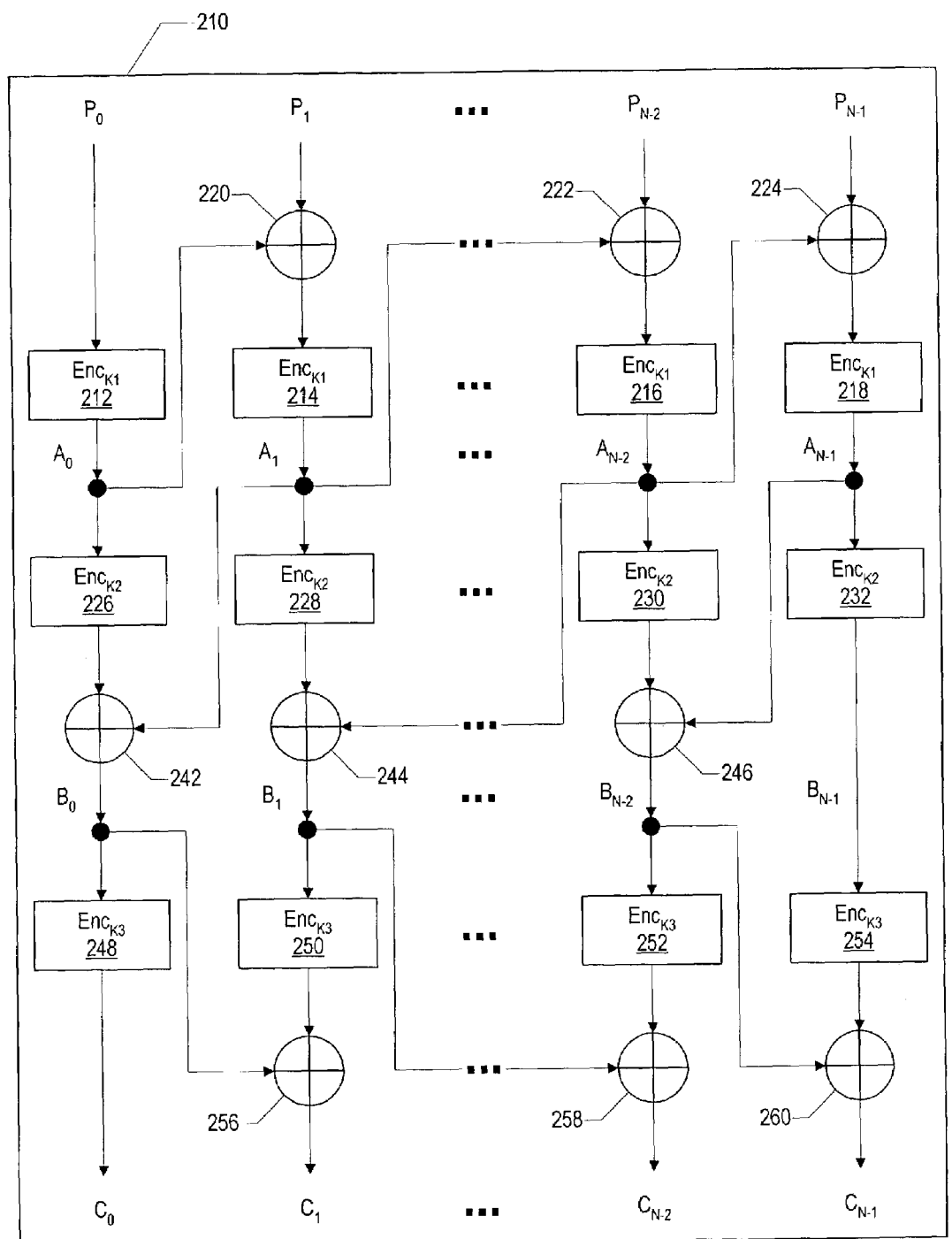
FIG. 2 is a block diagram illustrating a system for encrypting a message using a three-phase encryption process.

FIG. 2 is a block diagram illustrating a system for encrypting a message using the three-phase encryption process. Encryption device 210 is configured to receive the N blocks $P_0$–$P_{N-1}$ of the plain-text envelope P and generate the N blocks $C_0$–$C_{N-1}$ of cipher text C. Encryption device 210 includes: N−1 exclusive or modules 220, . . . , 222, and 224; N−1 exclusive or modules 242, 244, . . . , 246; N−1 exclusive or modules 256, . . . , 258, and 260; N encryption modules 212, 214, . . . , 216, and 218; N encryption modules 226, 228, . . . , 230, and 232; and N encryption modules 248, 250, . . . , 252, and 254. The exclusive or modules are configured to generate an output by performing a bitwise "xor" operation on the two inputs to the modules. The encryption modules are configured to generate an output according to the formula $$\text{Out}=Enc_{K_i}(\text{In}).$$

The function Enc( ) may be the encryption function of any block cipher encryption/decryption algorithm and $K_i$ is one of three keys $K_1$, $K_2$, and $K_3$ generated at the source. The first key is used in encryption modules 212–218, the second key is used in encryption modules 226–232, and the third key is used in encryption modules 248–254. The three keys are generated according to the formula:

$$K_i=Dec_M(R\oplus i), i=1,2,3.$$

Dec( ) may be the decryption function of any block cipher encryption/decryption algorithm, M is the secret master key, and $\oplus$ is the "xor" operator.

Initially, block $P_0$ is input into encryption module 212 to generate intermediate block $A_0$. Block $A_0$ and block $P_1$ are then input into exclusive or module 220 and the output from exclusive or module 220 is input into encryption module 214 to generate intermediate block $A_1$. The process repeats until block $A_{N-2}$ and block $P_{N-1}$ are input into exclusive or module 224 and the output from exclusive or module 224 is input into encryption module 218 to generate intermediate block $A_{N-1}$ to complete the first phase of the encryption process.

The second phase of the encryption process begins with intermediate block $A_{N-1}$ being input into encryption module 232 to generate intermediate block $B_{N-1}$. Block $A_{N-2}$ is then input into encryption module 230 and the output from encryption module 230 and block $A_{N-1}$ are input into exclusive or module 246 to generate intermediate block $B_{N-2}$. This process repeats until block $A_1$ is input into encryption module 226 and the output from encryption module 226 and block $A_0$ are input into exclusive or module 242 to generate intermediate block $B_0$ to complete the second phase of the encryption process.

The third phase of the encryption process begins with intermediate block $B_0$ being input into encryption module 248 to generate cipher text block $C_0$. Block $B_1$ is then input into encryption module 250 and the output from encryption module 250 and block $B_0$ are input into exclusive or module 256 to generate cipher text block $C_1$. This process repeats until block $B_{N-1}$ is input into encryption module 254 and the output from encryption module 254 and block $B_{N-2}$ are input into exclusive or module 260 to generate cipher text block $C_{N-1}$ to complete the third phase of the encryption process.

Figure 3:
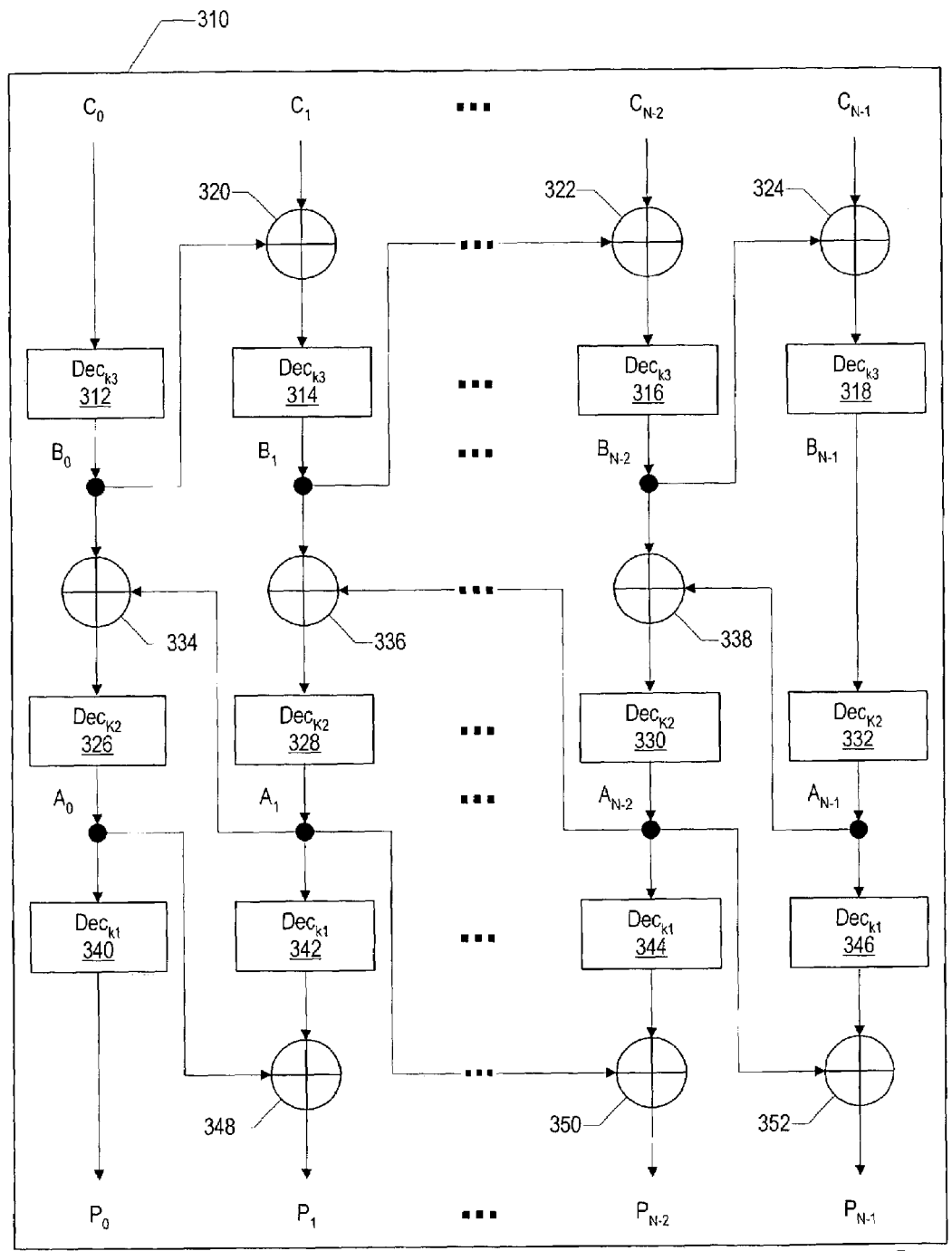
FIG. 3 is a block diagram illustrating a system for decrypting a message using a three-phase decryption process.

FIG. 3 is a block diagram illustrating a system for decrypting a message using a three-phase decryption process. Decryption device 310 is configured to receive the N blocks $C_0$–$C_{N-1}$ of cipher text C and generate the N blocks $P_0$–$P_{N-1}$ of the plain-text envelope P. Decryption device 310 includes: N–1 exclusive or modules 320, . . . , 322, and 324; N–1 exclusive or modules 334, 236, . . . , and 338; N–1 exclusive or modules 348, . . . , 350, and 352; N decryption modules 312, 314, . . . , 316, and 318; N decryption modules 326, 328, . . . , 330, and 332; and N decryption modules 340, 342, . . . , 344, and 346. The exclusive or modules are configured to generate an output by performing a bitwise "xor" operation on the two inputs to the modules. The decryption modules are configured to generate an output according to the formula:

$$Out = Dec_{K_i}(In).$$

The function Dec( ) may be the decryption function of any block cipher algorithm and $K_i$ is one of three keys $K_1$, $K_2$, and $K_3$ generated by the target. The third key is used in decryption modules 312–318, the second key is used in decryption modules 326–332, and the first key is used in decryption modules 340–346 The three keys are generated according to the formula:

$$K_i = Dec_M(R \oplus i), i=1,2,3.$$

Dec( ) may be the decryption function of any block cipher encryption/decryption algorithm, M is the secret master key, and $\oplus$ is the "xor" operator.

Initially, block $C_0$ is input into decryption module 312 to generate intermediate block $B_0$. Block $B_0$ and block $C_1$ are then input into exclusive or module 320 and the output from exclusive or module 320 is input into decryption module 314 to generate intermediate block $B_1$. The process repeats until block $C_{N-2}$ and block $C_{N-1}$ are input into exclusive or module 324 and the output from exclusive or module 324 is input into decryption module 318 to generate intermediate block $B_{N-1}$ to complete the first phase of the decryption process.

The second phase of the decryption process begins with intermediate block $B_{N-1}$ being input into decryption module 332 to generate intermediate block $A_{N-1}$. Block $B_{N-2}$ and block $A_{N-1}$ are input into exclusive or module 338 and the output from module 338 is input into decryption module 330 to generate intermediate block $A_{N-2}$. This process repeats until block $A_1$ and intermediate block $B_0$ are input into exclusive or module 334 and the output from exclusive or module 334 is input into decryption module 326 to generate intermediate block $A_0$ to complete the second phase of the decryption process.

The third phase of the decryption process begins with intermediate block $A_0$ being input into decryption module 340 to generate plain text block $P_0$. Block $A_1$ is then input into decryption module 342 and the output from decryption module 342 and block $A_0$ are input into exclusive or module 348 to generate plain text block $P_1$. This process repeats until block $A_{N-1}$ is input into decryption module 346 and the output from decryption module 346 and block $A_{N-2}$ are input into exclusive or module 352 to generate plain text block $P_{N-1}$ to complete the third phase of the decryption process.

Figure 4:
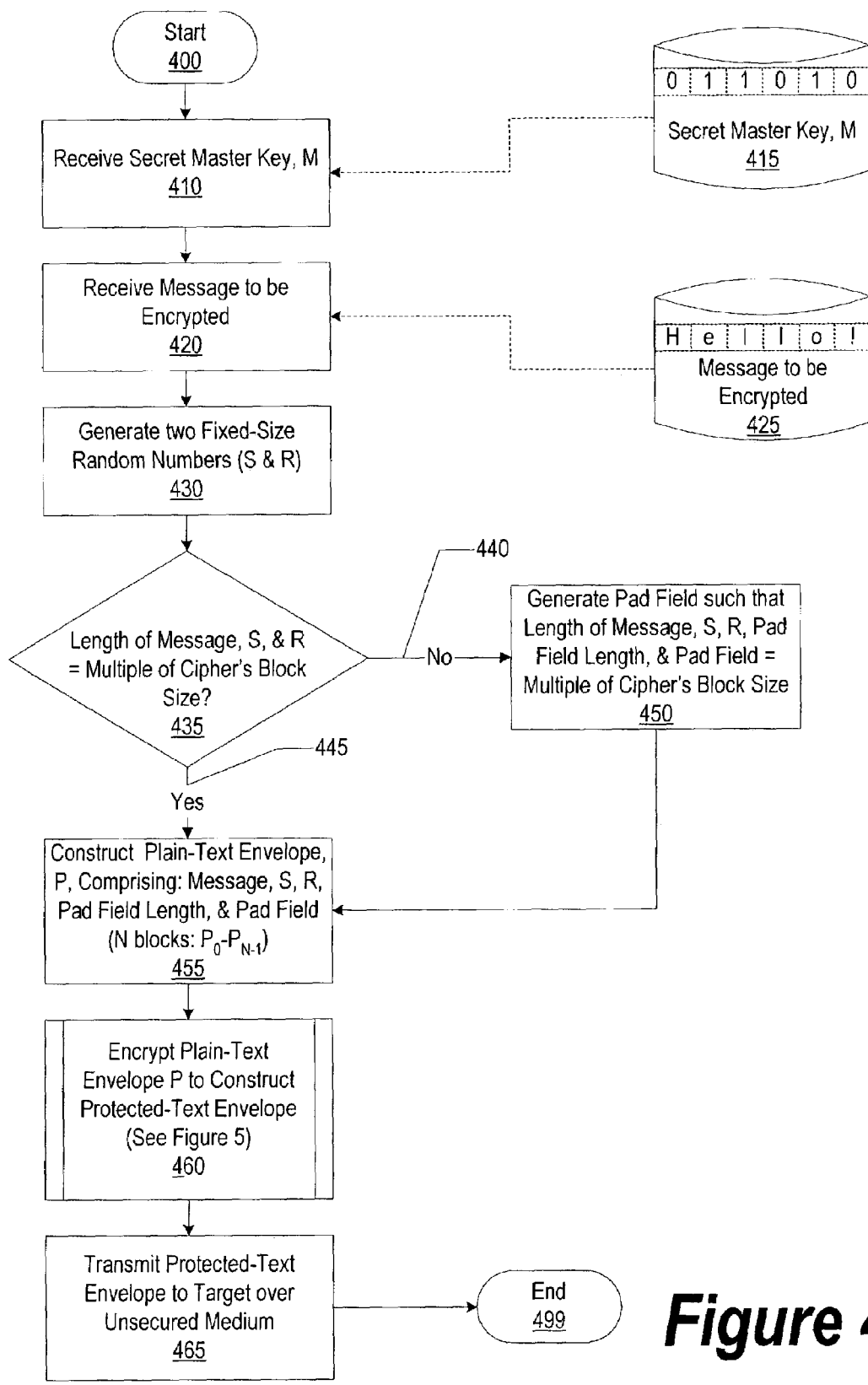
FIG. 4 is a flowchart illustrating a method for receiving, encrypting, and transmitting a message.

FIG. 4 is a flowchart illustrating a method for receiving, encrypting, and transmitting a message. Processing begins at 400 whereupon, at step 410, secret master key M is received by the source. The same secret master key M is shared between the source and the target. Secret master key M may be received from storage unit 415. The secret master key may be changed frequently to ensure the key's confidentiality. At step 420, the message to be encrypted may be received from storage unit 425. At step 430, two fixed-size random numbers (S & R) are generated.

A determination is then made as to whether a pad field is required to construct a plain-text envelope at decision 435. The plain-text envelope is formed using fixed-size random number S, a number indicating the length of the pad field (if any), the message to be encrypted, the pad field, and the fixed-size random number R. In an embodiment where a block cipher encryption algorithm is to be used in the encryption of the plain-text envelope, the size (length) of the envelope must be an integral multiple of the cipher's block size. For example, the block size for the AES block cipher algorithm is 128 bits. If the length of the message, S, R, and the number indicating the length of the pad field is an integral multiple of the cipher's block size, decision 435 branches to "yes" branch 445 whereupon processing continues at step 455.

If the length of the message, S, R, and the number indicating the length of the pad field is not an integral multiple of the cipher's block size, decision 435 branches to "no" branch 440 whereupon, at step 450, a pad field containing any arbitrary pattern is generated. The length of the pad field is chosen so as to provide a plain-text envelope having a length that is an integral multiple of the cipher's block size. At step 455, a plain-text envelope P is generated. In one embodiment, envelope P contains: the fixed-size random number S, a number indicating the length of the pad field, the message to be encrypted, the pad field, and the fixed-size random number R. Envelope P contains N equal-size blocks $P_0$–$P_{N-1}$.

Figure 5:
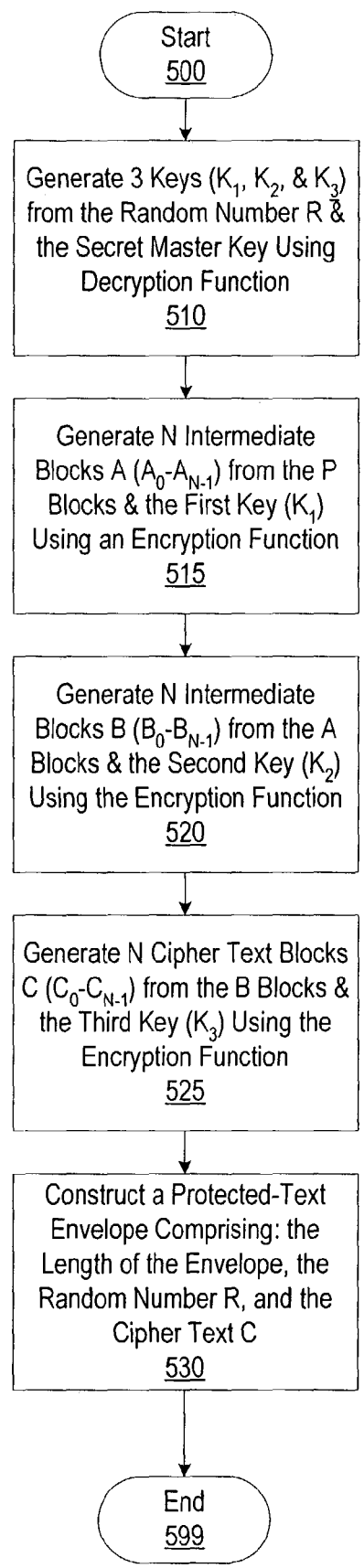
FIG. 5 is a flowchart illustrating a method for encrypting a message using a three-phase encryption process.

At step 460, the plain-text envelope P is encrypted using the three-phase encryption process to construct a protected-text envelope. More details of the encryption process are shown in the flowchart of FIG. 5. At step 465, the protected-text envelope is transmitted to the target over an unsecured medium such as the Internet.

FIG. 5 is a flowchart illustrating a method for encrypting a message using a three-phase encryption process. Processing begins at 500 whereupon at step 510, three keys are generated from the random number R and the secret master key using the decryption function of a block cipher algorithm. In one embodiment, the three keys may be generated according to the formula:

$$K_i = Dec_M(R \oplus i), i=1,2,3.$$

Dec( ) may be the decryption function of any block cipher encryption/decryption algorithm, M is the secret master key, and $\oplus$ is the "xor" operator.

At step 515, the first of three phases of the three-phase encryption is performed. N intermediate blocks A ($A_0$–$A_{N-1}$) are generated from the N blocks of the plain-text envelope and the first key using an encryption function according to the formulas:

$$A_i = \begin{cases} Enc_{K_1}(P_i) & i = 0 \\ Enc_{K_1}(P_i \oplus A_{i-1}) & i = 1, 2, \ldots, N-1 \end{cases}.$$

Enc( ) may an encryption function of a block cipher encryption/decryption algorithm.

At step 520, the second of three phases of the three-phase encryption is performed. N intermediate blocks B ($B_0$–$B_{N-1}$) are generated from the N intermediate A blocks and the second key $K_2$ using an encryption function according to the formulas:

$$B_i = \begin{cases} Enc_{K_2}(A_i) & i = N-1 \\ A_{i+1} \oplus Enc_{K_2}(A_i) & i = N-2, N-3, \ldots, 0 \end{cases}.$$

At step 525, the third and final phase of the three-phase encryption is performed. N cipher text blocks C ($C_0$–$C_{N-1}$) are generated from the N intermediate blocks B and the third key $K_3$ using an encryption function according to the formulas:

$$C_i = \begin{cases} Enc_{K_3}(B_i) & i = 0 \\ B_{i-1} \oplus Enc_{K_3}(B_i) & i = 1, 2, \ldots, N-1 \end{cases}.$$

A protected-text envelope is then constructed. In one embodiment, the protected-text envelope contains: the length of the envelope, the random number R, and the cipher text blocks C. Processing ends at 599.

Figure 6:
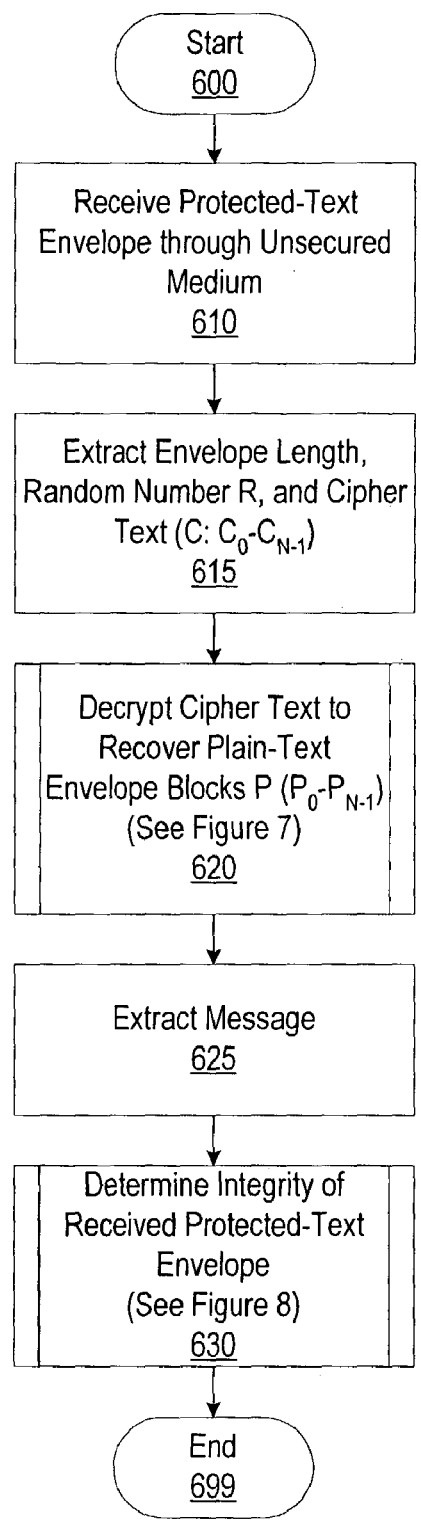
FIG. 6 is a flowchart illustrating a method for receiving encrypted text, decrypting the encrypted text, and extracting a message from the decrypted text.

FIG. 6 is a flowchart illustrating a method for receiving encrypted text, decrypting the encrypted text, and extracting a message from the decrypted text. Processing begins at 600 whereupon, at step 610, a protected-text envelope is received through an unsecured medium such as the Internet. In one embodiment, the protected-text envelope contains: the length of the envelope, a random number R, and N cipher text blocks C. The cipher text blocks typically contain a message in encrypted form. At step 615, the length of the envelope, the random number R, and the cipher text blocks C are extracted from the protected-text envelope. At step 620, the cipher text blocks are decrypted to recover N blocks of a plain-text envelope. More details on the decryption are provided in the flowchart of FIG. 7. In one embodiment, the plain-text envelope contains: a fixed-size random number R, a number representing the length of a pad field contained in the envelope, a message, the pad field, and an additional copy of random number R. The plain-text message is then extracted at step 625. At step 630, the integrity of the message is determined. More details on the integrity determination are provided in the flowchart of FIG. 8. Processing ends at 699.

Figure 7:
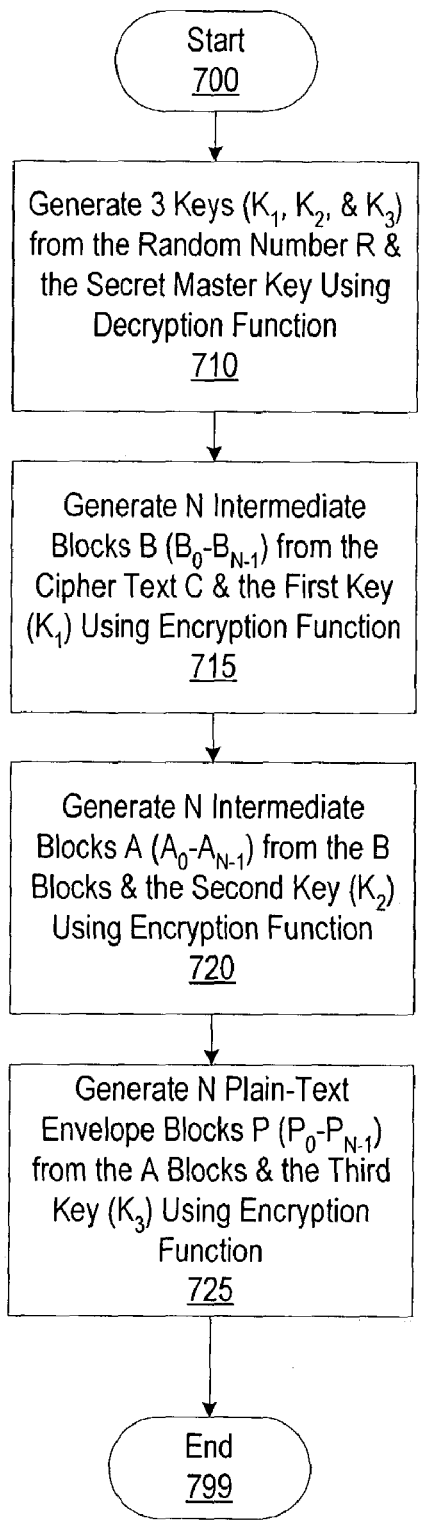
FIG. 7 is a flowchart illustrating a method for decrypting an encrypted message using a three-phase decryption process.

FIG. 7 is a flowchart illustrating a method for decrypting an encrypted message using a three-phase process. Processing begins at 700 whereupon at 710, three keys are generated from the extracted random number R and the secret master key M using the decryption function of a cipher algorithm. In one embodiment, the three keys may be generated according to the formula:

$$K_i = Dec_M(R \oplus i), i=1,2,3.$$

Dec( ) may be the decryption function of any block cipher encryption/decryption algorithm, M is the secret master key, and $\oplus$ is the "xor" operator.

At step 715, the first of three phases of the three-phase decryption is performed. The N intermediate blocks B ($B_0$–$B_{N-1}$) are regenerated from the N cipher text blocks C extracted from the received protected-text envelope and the first key $K_1$ using a decryption function according to the formulas:

$$B_i = \begin{cases} Dec_{K_3}(C_i) & i = 0 \\ Dec_{K_3}(C_i \oplus B_{i-1}) & i = 1, 2, \ldots, N-1 \end{cases}.$$

At step 720, the second of three phases of the three-phase decryption is performed. The N intermediate blocks A ($A_0$–$A_{N-1}$) are regenerated from the N intermediate B blocks and the second key $K_2$ using a decryption function according to the formulas:

$$A_i = \begin{cases} Dec_{K_2}(B_i) & i = N-1 \\ Dec_{K_2}(B_i \oplus A_{i+1}) & i = N-2, N-3, \ldots, 0 \end{cases}.$$

At step 725, the third and final phase of the three-phase decryption is performed. The N blocks of the plain-text envelope are ($P_0$–$P_{N-1}$) are regenerated from the N intermediate A blocks and the third key $K_3$ using an encryption function according to the formula:

$$P_i = \begin{cases} Dec_{K_1}(A_i) & i = 0 \\ A_{i-1} \oplus Dec_{K_1}(A_i) & i = 1, 2, \ldots, N-1 \end{cases}.$$

Figure 8:
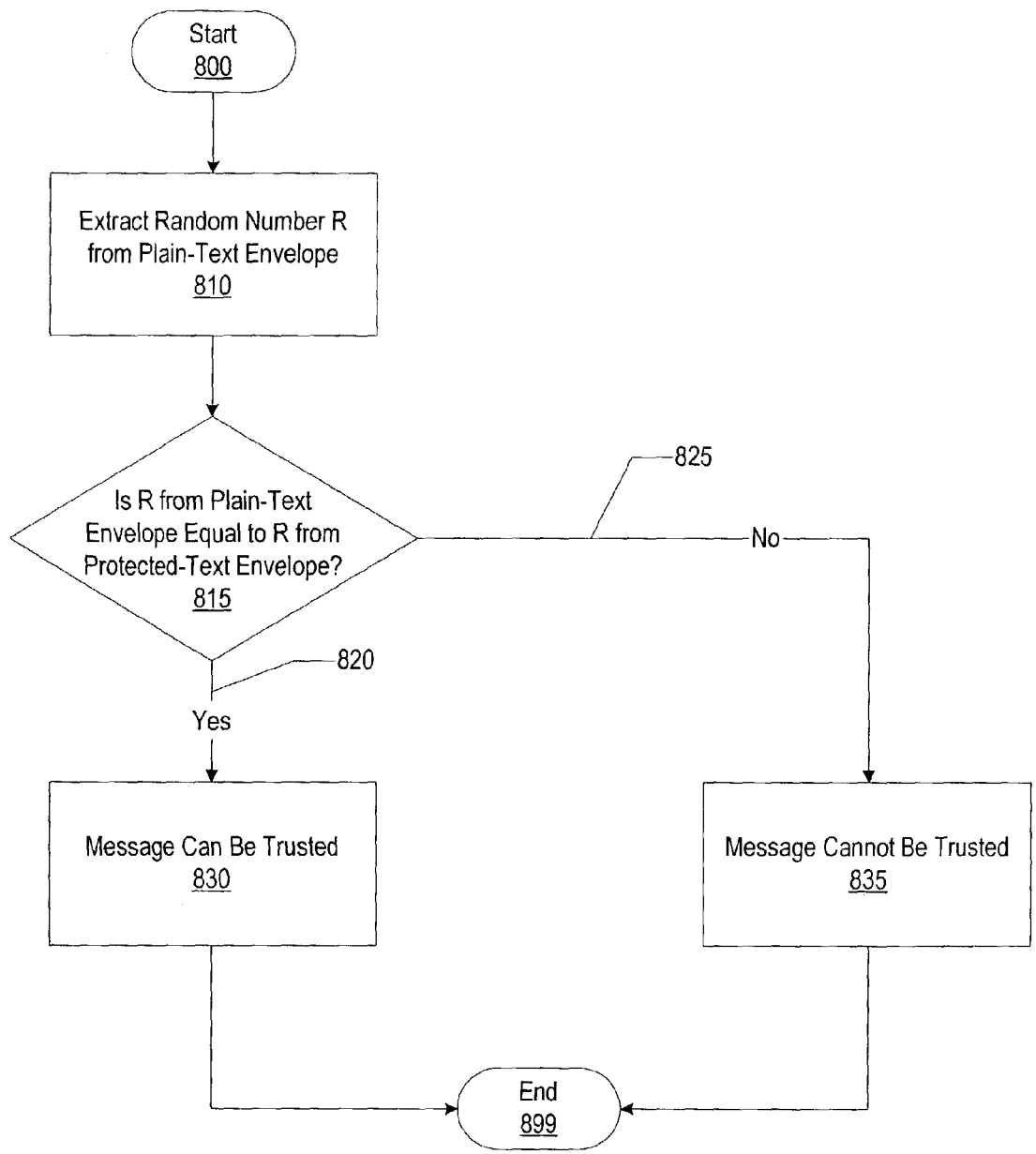
FIG. 8 is a flowchart illustrating a method for verifying the integrity of a received and decrypted message.

FIG. 8 is a flowchart illustrating a method for verifying the integrity of a decrypted message. At step 810, a second copy of the random number R is extracted from the decrypted plain-text envelope P. A first copy of the random number R is extracted from the protected-text envelope C. A determination is then made as to whether the random number R extracted from the plain-text envelope is equal to the random number R extracted from the protected-text envelope R at decision 815. If the two numbers are equal, decision 815 branches to "yes" branch 820 whereupon, at step 830, it is determined that the decrypted message can be trusted. In other words, it is determined that it is highly unlikely that anyone has tampered with the message while the message was being transmitted though the unsecured medium. If the two numbers are not equal, decision 815 branches to "no" branch 825 whereupon, at step 835, it is determined that the decrypted message cannot be trusted. In other words, it is determined that it is highly likely that someone has tampered with the message while the message was being transmitted though the unsecured medium. Processing ends at 899.

Figure 9:
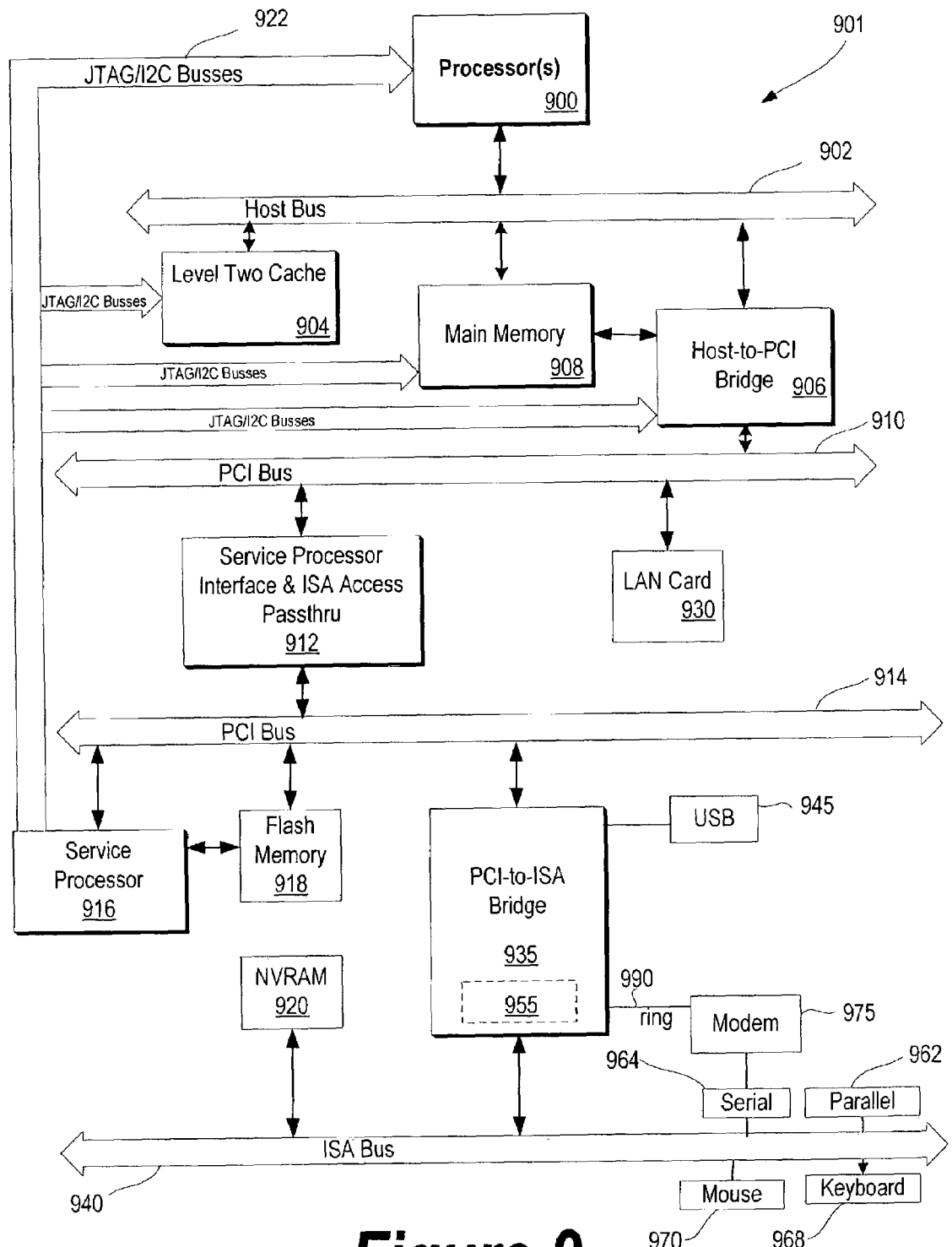
FIG. 9 illustrates an information handling system that is a simplified example of a computer system capable of performing the operations described herein.

FIG. 9 illustrates information handling system 901 which is a simplified example of a computer system capable of performing the computing operations described herein. Computer system 901 includes processor 900 which is coupled to host bus 902. A level two (L2) cache memory 904 is also coupled to host bus 902. Host-to-PCI bridge 906 is coupled to main memory 908, includes cache memory and main memory control functions, and provides bus control to handle transfers among PCI bus 910, processor 900, L2 cache 904, main memory 908, and host bus 902. Main memory 908 is coupled to Host-to-PCI bridge 906 as well as host bus 902. Devices used solely by host processor(s) 900, such as LAN card 930, are coupled to PCI bus 910. Service Processor Interface and ISA Access Pass-through 912 provides an interface between PCI bus 910 and PCI bus 914. In this manner, PCI bus 914 is insulated from PCI bus 910. Devices, such as flash memory 918, are coupled to PCI bus 914. In one implementation, flash memory 918 includes BIOS code that incorporates the necessary processor executable code for a variety of low-level system functions and system boot functions.

PCI bus 914 provides an interface for a variety of devices that are shared by host processor(s) 900 and Service Processor 916 including, for example, flash memory 918. PCI-to-ISA bridge 935 provides bus control to handle transfers between PCI bus 914 and ISA bus 940, universal serial bus (USB) functionality 945, power management functionality 955, and can include other functional elements not shown, such as a real-time clock (RTC), DMA control, interrupt support, and system management bus support. Nonvolatile RAM 920 is attached to ISA Bus 940. Service Processor 916 includes JTAG and I2C busses 922 for communication with processor(s) 900 during initialization steps. JTAG/I2C busses 922 are also coupled to L2 cache 904, Host-to-PCI bridge 906, and main memory 908 providing a communications path between the processor, the Service Processor, the L2 cache, the Host-to-PCI bridge, and the main memory. Service Processor 916 also has access to system power resources for powering down information handling device 901.

Peripheral devices and input/output (I/O) devices can be attached to various interfaces (e.g., parallel interface 962, serial interface 964, keyboard interface 968, and mouse interface 970 coupled to ISA bus 940. Alternatively, many I/O devices can be accommodated by a super I/O controller (not shown) attached to ISA bus 940.

In order to attach computer system 901 to another computer system to copy files over a network, LAN card 930 is coupled to PCI bus 910. Similarly, to connect computer system 901 to an ISP to connect to the Internet using a telephone line connection, modem 975 is connected to serial port 964 and PCI-to-ISA Bridge 935.

While the computer system described in FIG. 9 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for encrypting a message, the method comprising:
  receiving a plain-text envelope that includes a first block, a last block and a plurality of middle blocks between the first and last blocks, wherein each of the middle blocks includes a first neighboring block and a second neighboring block, and wherein a first random number is included as the first block;
  generating a first key, a second key, and a third key;
  for each middle block:
    generating a first intermediate value using the middle block, the first key, and a first encrypted value, received from the middle block's first neighboring block;
    generating a second intermediate value using the first intermediate value, the second key, and a second encrypted value received from the middle block's second neighboring block;
    generating a cipher-text block using the second intermediate value, the third key, and a third encrypted value received from the middle block's first neighboring block; and
    wherein the first intermediate value is used by the middle block's first neighboring block to generate the first neighboring block's second intermediate value and wherein the first intermediate value is used by the middle block's second neighboring block to generate the second neighboring block's first intermediate value.

2. The method of claim 1, further comprising receiving a secret master key.

3. The method of claim 2, further comprising generating the first random number and a second random number.

4. The method of claim 3, further comprising generating a pad field such that a length of a plain-text message, the first random number, the second random number, the pad field, and a number indicating a length of the pad field is an integer multiple of a block size of a block cipher algorithm.

5. The method of claim 4, further comprising constructing the plain-text envelope, wherein the plain-text envelope includes the plain-text message, the first random number, the second random number, the pad field, and the number indicating the length of the pad field.

6. The method of claim 3, further comprising constructing a protected-text envelope, wherein the protected-text envelope includes a number indicating a length of the protected-text envelope, the second random number, a first cipher-text block created from the first block, a last cipher-text block created from the last block, and the cipher-text blocks generated from each of the middle blocks.

7. The method of claim 6, further comprising transmitting the protected-text envelope to a target over an unsecured medium.

8. The method of claim 3, wherein the generating the first key, the second key, and the third key comprises generating the first key, the second key, and the third key from the secret master key and the first random number.

9. The method of claim 3, wherein the generating the first key, the second key, and the third key comprises generating the first key, the second key, and the third key from the secret master key and the first random number using a decryption function of a block cipher algorithm.

10. The method of claim 1, wherein the generating the first intermediate value, generating the second intermediate value, and generating the cipher-text block comprises using an encryption function of a block cipher algorithm.

11. The method of claim 1 wherein the first random number extends to one or more subsequent blocks following the first block.

12. A method for decrypting a cipher text message, the method comprising:
receiving a cipher-text envelope that includes a first block, a last block, and a plurality of middle blocks between the first and last blocks, wherein each of the middle blocks includes a first neighboring block and a second neighboring block;
generating a first key, a second key, and a third key;
generating a plain-text envelope, wherein generating the plain-text envelope further includes performing the following steps for each middle block:
generating a first intermediate value using the middle block, the first key, and a first decrypted value received from the middle block's first neighboring block;
generating a second intermediate value using the first intermediate value, the second key, and a second decrypted value received from the middle block's second neighboring block;
generating a plain-text block using the second intermediate value, the third key, and a third encrypted value received the middle block's first neighboring block; and
wherein the second intermediate value is used by the middle block's first neighboring block to generate the first neighboring block's second intermediate value and wherein the first intermediate value is used by the middle block's second neighboring block to generate the second neighboring block's plain-text block.

13. The method of claim 12, wherein the cipher-text envelope further includes a first control number and wherein the plain-text envelope includes a plain-text message and a second control number.

14. The method of claim 13, further comprising setting an integrity of the received cipher-text envelope to:
a "Can be Trusted" setting if the first control number is equal to the second control number; and
a "Cannot be Trusted" setting if the first control number is not equal to the second control number.

15. The method of claim 13, further comprising receiving a secret master key.

16. The method of claim 15, wherein the generating the first key, the second key, and the third key comprises generating the first key, the second key, and the third key from the secret master key and the first control number.

17. The method of claim 15, wherein the generating the first key, the second key, and the third key comprises generating the first key, the second key, and the third key from the secret master key and the first control number using a decryption function of a block cipher algorithm.

18. The method of claim 12, wherein the generating the first intermediate value, generating the second intermediate value, and generating the plain-text block comprises using a decryption function of a block cipher algorithm.

19. The method of claim 12, further comprising receiving the cipher-text envelope from a source over an unsecured medium.

20. An information handling system comprising:
one or more processors;
a memory accessible from the processors;
a receiver accessible from the processors far receiving data;
a message encryption tool that encrypts messages, the message encryption tool enabled to:
receive a plain-text envelope at the receiver, wherein the plain-text envelope includes a first block, a last block and a plurality of middle blocks between the first and last blocks, wherein each of the middle blocks includes a first neighboring block and a second neighboring block, and wherein a first random number is included as the first block;
generate a first key, a second key, and a third key;
for each middle block:
generate a first intermediate value using the middle block, the first key, and a first encrypted value received from the middle block's first neighboring block;
generate a second intermediate value using the first intermediate value, the second key, and a second encrypted value received from the middle block's second neighboring block;
generate a cipher-text block using the second intermediate value, the third key, and a third encrypted value received from the middle block's first neighboring block; and
wherein the first intermediate value is used by the middle block's first neighboring block to generate the first neighboring block's second intermediate value and wherein the first intermediate value is used by the middle block's second neighboring block to generate the second neighboring block's first intermediate value.

21. The information handling system of claim 20, wherein the message encryption tool is further enabled to receive a secret master key.

22. The information handling system of claim 21, wherein the message encryption tool is further enabled to generate the first random number and a second random number.

23. The information handling system of claim 22, wherein the message encryption tool is further enabled to generate a pad field such that a length of the plain-text message, the first random number, the second random number, the pad field, and a number indicating a length of the pad field is an integer multiple of a block size of a block cipher algorithm.

24. The information handling system of claim 23, wherein the message encryption tool is further enabled to construct the plain-text envelope, and wherein the plain-text envelope includes the plain-text message, the first random number, the second random number, the pad field, and the number indicating the length of the pad field.

25. The information handling system of claim 22, wherein the message encryption tool is further enabled to construct a protected-text envelope, wherein the protected-text envelope includes a number indicating a length of the protected-text envelope, the second random number, a first cipher-text block created from the first block, a last cipher-text block created from the last block, and the cipher-text blocks generated from each of the middle blocks.

26. The information handling system of claim 25, wherein the message encryption tool is further enabled to transmit the protected-text envelope to a target over an unsecured medium.

27. The information handling system of claim 22, wherein, in order to generate the first key, the second key, and the third key, the message encryption tool is further enabled to generate the first key, the second key, and the third key from the secret master key and the first random number.

28. The information handling system of claim 22, wherein, in order to generate the first key, the second key, and the third key, the message encryption tool is further enabled to generate the first key, the second key, and the third key from the secret master key and the first random number using a decryption function of a block cipher algorithm.

29. The information handling system of claim 20, wherein, in order to generate the first intermediate value, the second intermediate value, and the cipher-text block, the message encryption tool is further enabled to use an encryption function of a block cipher algorithm.

30. The information handling system of claim 20, wherein the first random number extends to one or more subsequent blocks following the first block.

31. An information handling system comprising:
one or more processors;
a memory accessible from the processors;
a receiver accessible from the processors for receiving data;
a message decryption tool that decrypts messages, the message decryption tool enabled to:
receive a cipher-text envelope at the receiver, wherein the cipher-text envelope includes a first block, a last block, and a plurality of middle blocks between the first and last blocks, wherein each of the middle blocks includes a first neighboring block and a second neighboring block;
generate a first key, a second key, and a third key;
generate a plain-text envelope by doing the following for each middle block:
generate a first intermediate value using the middle block, the first key, and a first decrypted value received from the middle block's first neighboring block;
generate a second intermediate value using the first intermediate value, the second key, and a second decrypted value received from the middle block's second neighboring block;
generate a plain-text block using the second intermediate value, the third key, and a third encrypted value received from the middle block's first neighboring block; and wherein the second intermediate value is used by the middle block's first neighboring block to generate the first neighboring block's second intermediate value and wherein the first intermediate value is used by the middle block's second neighboring block to generate the second neighboring block's plain-text block.

32. The information handling system of claim 31, wherein the cipher-text envelope further includes a first control number and wherein the plain-text envelope includes a plain-text message and a second control number.

33. The information handling system of claim 32, wherein the message decryption tool is further enabled to set an integrity of the received cipher-text envelope to:
a "Can be Trusted" setting if the first control number is equal to the second control number; and
a "Cannot be Trusted" setting if the first control number is not equal to the second control number.

34. The information handling system of claim 32, wherein the message decryption tool is further enabled to receive a secret master key.

35. The information handling system of claim 34, wherein, in order to generate the first key, the second key, and the third key, the message decryption tool is further enabled to generate the first key, the second key, and the third key from the secret master key and the first control number.

36. The information handling system of claim 34, wherein, in order to generate the first key, the second key, and the third key, the message decryption tool is further enabled to generate the first key, the second key, and the third key from the secret master key and the first control number using a decryption function of a block cipher algorithm.

37. The information handling system of claim 31, wherein, in order to generate the first intermediate value, the second intermediate value, and the plain-text block, the message decryption tool is further enabled to use a decryption function of a block cipher algorithm.

38. The information handling system of claim 31, wherein the message decryption tool is further enabled to receive the cipher-text envelope from a source over an unsecured medium.

39. A computer program product stored on a computer operable media for encrypting a message, the computer program product comprising:
means for receiving a plain-text envelope that includes a first block, a last block and a plurality of middle blocks between the first and last blocks, wherein each of the middle blocks includes a first neighboring block and a second neighboring block, and wherein a first random number is included as the first block;
means for generating a first key, a second key, and a third key;
for each middle block:
means for generating a first intermediate value using the middle block, the first key, and a first encrypted value received from the middle block's first neighboring block;
means for generating a second intermediate value using the first intermediate value, the second key, and a second encrypted value received from the middle block's second neighboring block;
means for generating a cipher-text block using the second intermediate value, the third key, and a third encrypted value received from the middle block's first neighboring block; and wherein the first intermediate value is used by the middle block's first neighboring block to generate the first neighboring block's second intermediate value and wherein the first intermediate value is used by the middle block's second neighboring block to generate the second neighboring block's first intermediate value.

40. The computer program product of claim 39, further comprising means for receiving a secret master key.

41. The computer program product of claim 40, further comprising means for generating the first random number and a second random number.

42. The computer program product of claim 41, further comprising means for generating a pad field such that a length of a plain-text message, the first random number, the second random number, the pad field, and a number indicating a length of the pad field is an integer multiple of a block size of a block cipher algorithm.

43. The computer program product of claim 42, further comprising means for constructing the plain-text envelope, wherein the plain-text envelope includes the plain-text message, the first random number, the second random number, the pad field, and the number indicating the length of the pad field.

44. The computer program product of claim 41, further comprising means for constructing a protected-text envelope, wherein the protected-text envelope includes, a number indicating a length of the protected-text envelope, the second random number, a first cipher-text block created from the first block, a last cipher-text block created from the last block, and the cipher-text blocks generated from each of the middle blocks.

45. The computer program product of claim 45, further comprising means for transmitting the protected-text envelope to a target over an unsecured medium.

46. The computer program product of claim 41, wherein the means for generating the first key, the second key, and the third key comprises means for generating the first key, the second key, and the third key from the secret master key and the first random number.

47. The computer program product of claim 41, wherein the means for generating the first key, the second key, and the third key comprises means for generating the first key, the second key, and the third key from the secret master key and the first random number using a decryption function of a block cipher algorithm.

48. The computer program product of claim 39, wherein the means for generating the first intermediate value, the second intermediate value, and the cipher-text block comprises means for using an encryption function of a block cipher algorithm.

49. The computer program product of claim 39 wherein the first random number extends to one or more subsequent blocks following the first block.

50. A computer program product for decrypting a cipher text message, the computer program product comprising:
    means for receiving a cipher-text envelope that includes a first block, a last block, and a plurality of middle blocks between the first and last blocks, wherein each of the middle blocks includes a first neighboring block and a second neighboring block;
    means for generating a first key, a second key, and a third key;
    means for generating a plain-text envelope, wherein the means for generating the plain-text envelope further includes the following for each middle block:
        means for generating a first intermediate value using the middle block, the first key, and a first decrypted value received from the middle block's first neighboring block;
        means for generating a second intermediate value using the first intermediate value, the second key, and a second decrypted value received from the middle block's second neighboring block;
        means for generating a plain-text block using the second intermediate value, the third key, and a third encrypted value received from the middle block's first neighboring block; and
        wherein the second intermediate value is used by the middle block's first neighboring block to generate the first neighboring block's second intermediate value and wherein the intermediate value is used by the middle block's second neighboring block to generate the second neighboring block's plain-text block.

51. The computer program product of claim 50, wherein the cipher-text envelope further includes a first control number and wherein the plain-text envelope includes a plain-text message and a second control number.

52. The computer program product of claim 51, further comprising means for setting an integrity of the received cipher-text envelope to:
    a "Can be Trusted" setting if the first control number is equal to the second control number; and
    a "Cannot be Trusted" setting if the first control number is not equal to the second control number.

53. The computer program product of claim 51, further comprising means for receiving a secret master key.

54. The computer program product of claim 53, wherein the means for generating the first key, the second key, and the third key comprises means for generating the first key, the second key, and the third key from the secret master key and the first control number.

55. The computer program product of claim 53, wherein the means for generating the first key, the second key, and the third key comprises means for generating the first key, the second key, and the third key from the secret master key and the first control number using a decryption function of a block cipher algorithm.

56. The computer program product of claim 50, wherein the means for generating the first intermediate value, the second intermediate value, and the plain-text block comprises using a decryption function of a block cipher algorithm.

57. The computer program product of claim 50, further comprising means for receiving the cipher-text envelope from a source over an unsecured medium.

* * * * *

UNITED STATES PATENT AND TRADEMARK OFFICE
CERTIFICATE OF CORRECTION

PATENT NO. : 6,996,233 B2 Page 1 of 1
APPLICATION NO. : 10/464891
DATED : February 7, 2006
INVENTOR(S) : Brokenshire et al.

It is certified that error appears in the above-identified patent and that said Letters Patent is hereby corrected as shown below:

column 10, line 38, please delete "value," and insert --value--.
column 11, line 51, please delete "received the" and insert --received from the--.
column 12, line 24, please delete "far" and insert --for--.
column 15, line 33, please delete "45," and insert --44,--.

Signed and Sealed this

Eighth Day of August, 2006

JON W. DUDAS
*Director of the United States Patent and Trademark Office*